Figure 1:
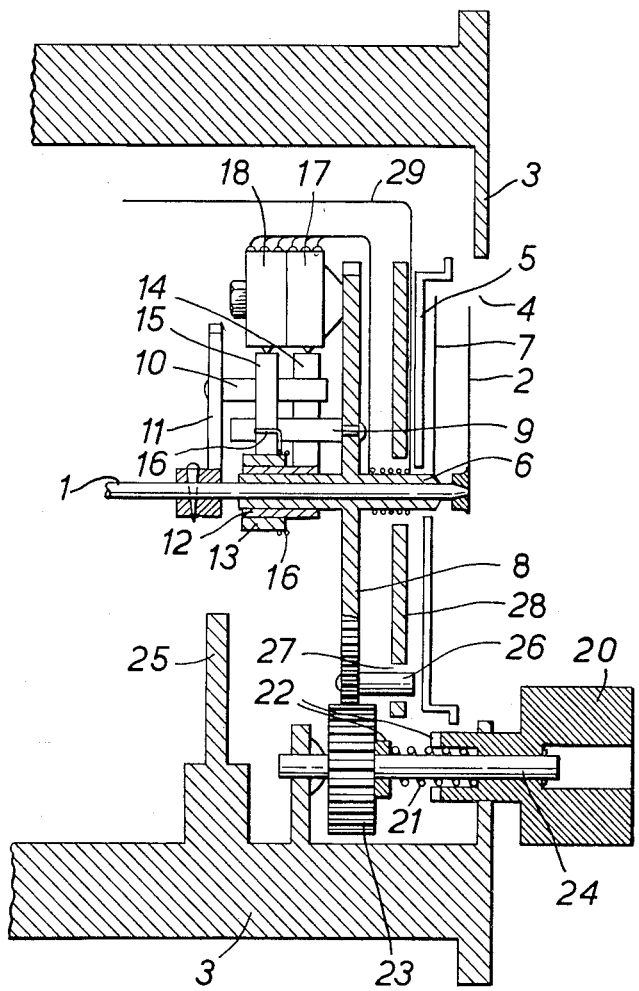

May 21, 1963  D. L. SPENCER  3,090,397
LEVEL INDICATING AND CONTROL INSTRUMENTS
Filed Oct. 2, 1961  2 Sheets-Sheet 1

INVENTOR:
D. L. SPENCER
BY: Moore & Hall
ATTORNEYS.

May 21, 1963   D. L. SPENCER   3,090,397
LEVEL INDICATING AND CONTROL INSTRUMENTS
Filed Oct. 2, 1961   2 Sheets-Sheet 2

INVENTOR:
D. L. SPENCER
BY: Morse y Hall
ATTORNEYS.

3,090,397
LEVEL INDICATING AND CONTROL
INSTRUMENTS
Dennis Lincoln Spencer, Bishops Cleeve, Cheltenham, England, assignor to S. Smith & Sons (England) Limited, London, England, a British company
Filed Oct. 2, 1961, Ser. No. 142,300
Claims priority, application Great Britain Oct. 6, 1960
14 Claims. (Cl. 137—391)

The present invention relates to indicating instruments of the kind in which a pointer is mounted on a shaft and rotates relative to a scale on rotation of the shaft.

Where such indicators are employed to indicate the amount of liquid in one or more containers, such as fuel tanks on a vehicle for example, it is often useful, when filling or emptying the containers, to have some means of setting on the indicator by means of an auxiliary pointer, a value at which an electrical switch is actuated, the condition of the switch being used to control the flow of liquid into or out of the containers and/or to operate some form of indicator such as a warning light or a buzzer. In particular, in aircraft fuel systems, where both defuelling and re-fuelling of the tanks is carried out, the auxiliary indicator may conveniently actuate switching means which can be used to control the flow of fuel either so that de-fuelling is not continued beyond the point at which the tanks contain less fuel than an amount set by the auxiliary pointer, or so that re-fuelling cannot be carried on beyond the point at which the tanks contain more fuel than an amount set by the auxiliary pointer.

According to the present invention, an indicating instrument of the kind in which a pointer is mounted on a shaft and rotates relative to a scale on rotation of the shaft, is provided with an auxiliary pointer which is mounted for rotation independently of the main pointer but about a common axis, a pair of actuating pins, mounted to lie parallel to but displaced at different distances from the common axis, one for rotation about the common axis with the main pointer and at the other for rotation about the common axis with the auxiliary pointer, a pair of cams mounted for independent rotation about the common axis, and a spring or springs for biasing the cams towards one another, the arrangement of the pins and the cams being such that, when the main and auxiliary pointers are aligned with one another, the pins are aligned with one another and the cams are held apart against the action of the biasing spring by the pins and there being provided further a pair of switches mounted for rotation either with the main or the auxiliary pointer and positioned with respect to the cams so that each is actuated by a respective one of the cams only when that cam is in contact with the actuating pin which rotates with the pointer with which the switches rotate.

Preferably, the switches are mounted for rotation with the auxiliary pointer.

The switches when actuated by the respective ones of the cams will take up a first switching condition and, when not actuated, will take up a second switching condition different from the first one. In a simple case, each switch may have a single contact which is either open or closed in the first condition when the switch is not actuated, and closed or open respectively in the second condition when the switch is actuated.

The auxiliary pointer may be mounted on a sleeve coaxial with, and able to rotate with respect to, the shaft carrying the main pointer. The sleeve may carry a gear wheel which is also coaxial with the shaft, and there may be provided a manual setting knob for setting the position of the auxiliary pointer and driving means for imparting rotary motion from the knob to the gear wheel, the driving means being such that when the knob is not operated, a frictional torque is available to resist motion of the gear wheel.

The cams may simply be arms projecting radially with respect to the common axis at different points along its length, each being mounted on a sleeve mounted coaxially with the shaft for rotation with respect to it and each other. The actuating pins are preferably mounted so that they project past the arms of the cams from opposite directions. The actuating pin which is mounted for rotation with the auxiliary pointer, may be mounted on the gear wheel. The actuating pin which is mounted for rotation with the main pointer, may be secured to an arm projecting radially from the shaft.

The switches may conveniently be micro-switches, the operating members of which are positioned to be depressed by the cams when in a particular angular position relative to the pointer with which the switches rotate.

A vehicle's fuel system, for example an aircraft's fuel system, may include one or more indicating instruments according to the present invention, the shafts of which are driven so that the main pointer indicates on the scale the contents of one or more fuel tanks, the switches being connected in electric control circuits for operating flow control elements in the fuel system. In particular each switch may be connected in a control circuit arranged so that, if the switch is not actuated by the respective cam, the circuit is conditioned to permit opening of a fuel flow control valve but so that the valve is closed if the switch is so actuated.

Figure 2:
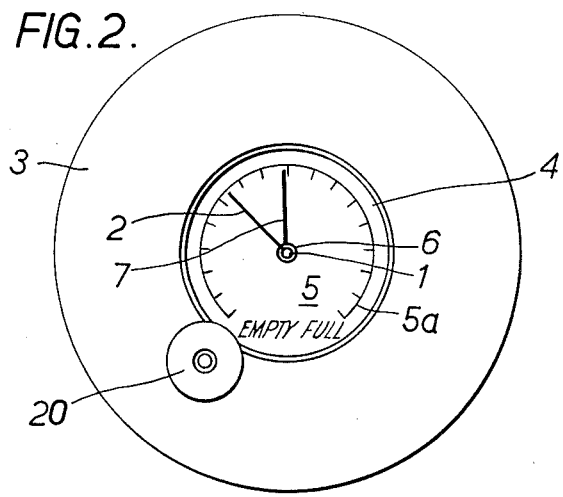
Figure 3:
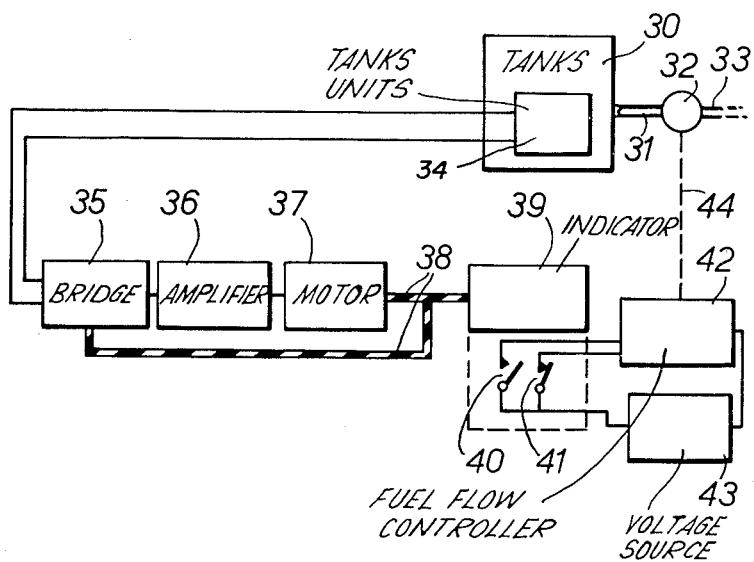

One example of an indicating instrument according to the present invention will now be described with reference to the accompanying drawings in which:

FIGURE 1 shows a section through the instrument in a plane containing the axis of the shaft, FIGURE 2 shows a simplified representation of the instrument dial and pointers and FIGURE 3 is a block diagram representing a simple example of an aircraft's fuel system together with a fuel contents gauging system incorporating an indicating instrument according to the invention.

Referring now to FIGURES 1 and 2 of the drawings, the instrument which is intended for use in an aircraft's fuel system for indication of the liquid contents of the tanks, comprises a shaft 1 which is mounted for rotation in bearings (not shown) about its longitudinal axis and carries a conventional indicating pointer 2. The instrument case 3 is provided in conventional manner with a circular viewing aperture 4 in which is positioned a dial 5 carrying a scale 5a (not shown in FIGURE 1) over which the outer end of the pointer 2 rotates on rotation of the shaft 1.

Mounted coaxially on the shaft 1 for independent rotation with respect to it is a sleeve 6 which carries an auxiliary pointer 7, the outer end of which rotates over the scale 5a on rotation of the sleeve 6 in the same manner as the main pointer 2. The sleeve 6 also carries a gear wheel 8 to which is secured a pin 9 lying parallel to but displaced from the axis of the shaft 1. A second similar pin 10 is carried by an arm 11 which is secured to the shaft 1, the pin 10 also lying parallel to the axis of the shaft 1 but displaced further from it than the pin 9. The pins 9 and 10 will rotate about the axis of the shaft 1 with the auxiliary pointer 7 and the main pointer 2, respectively, and are arranged to be aligned with their longitudinal axes in a plane also containing the axis of the shaft 1 when the main and auxiliary pointers 2 and 7 are aligned with the same point on the scale.

Further sleeves 12 and 13 which are coaxial with and mounted for free rotation with respect to the sleeve 6 and the shaft 1, carry cams 14 and 15 in the form of radial arms which are spaced from one another along the length of the shaft, i.e. axially. A light spring 16 is secured to the cams 14 and 15 and biases them towards one another, the arrangement of the pins 9 and 10, the cams 14 and 15 and the spring 16 being such that, when the pins 9 and 10 are aligned, the cams 14 and 15 are separated only by the pins 9 and 10 and are held against them by the action of the spring 16. This condition is shown in FIGURE 1.

The gear wheel 8 also carries a pair of microswitches 17 and 18 which are positioned with their plungers directed radially inwards towards the axis of the shaft 1 and spaced apart axially with the same spacing as the cams 14 and 15. The switches 17 and 18 are also positioned on the gear wheel 8 so that the plungers are in the same radial plane (radial with respect to the axis of the shaft 1) as the pin 9 and at a distance from the axis of the shaft 1 such that the plungers are depressed, thus actuating the switches, by respective ones of the cams 14 and 15 when they are in contact with the pin 9. If the pins 9 and 10 are not aligned, one of the cams 14 and 15, the particular one depending on the direction of misalignment, will be forced back out of contact with the pin 9 by the pin 10 against the action of the spring 16, thus allowing the plunger of the respective one of the switches to be released.

To allow the position of the auxiliary pointer 7 relative to the scale to be adjusted, there is provided a manual adjusting knob 20 which can be pushed in against the action of a spring 21 to engage a dog clutch 22, thus enabling subsequent rotation of the knob 20 to cause rotation of a gear 23 which is mounted on a shaft 24 and engages the gear wheel 8. It is arranged that there is sufficient friction in this manual drive arrangement when the knob 20 is not depressed that the gear wheel 8 is held still against any tendency to rotate.

A stop 25 which is integral with the casing 3, is provided to engage the outer end of the arm 11 and thus to limit the movement of the pointer 2 and shaft 1 to an arc of less than 360°. Similarly, a pin 26 on the gear wheel 8 projects into an arcuate slot 27 in a plate 28, which is fixed with respect to the casing 3, to limit the movement of the auxiliary pointer 7 to an arc of less than 360°. These provisions are to ensure that the required relative positions of the pins 9 and 10 and cams 14 and 15 are maintained.

The micro-switches 17 and 18 are provided with leads enabling them to be connected to associated electrical circuits, these being combined in a single multicore lead 29 which is led out of the case after being coiled around the sleeve 6 to allow for the movement of the microswitches 17 and 18.

In a simple case, the micro-switches 17 and 18 may be simple on/off switches, each having an electrical contact which is opened on depression of its plunger by the respective one of the cams 14 and 15 but otherwise remains closed. When the pointers 2 and 7 are aligned and both plungers are depressed both switch contacts will be open. If the pointer 2 indicates a greater amount than the pointer 7 (it will here be assumed that a greater amount results in an increasing clockwise rotation of the pointers 2 and 7 as shown in FIGURE 2), the pin 10 will have forced the cam 14 to rotate clockwise relative to the pointer 7 against the action of the spring 16 thus allowing the contact in switch 17 to close. The contact in switch 18 will however remain open. Similarly, if the pointer 2 indicates a smaller amount than the pointer 7, the pin 10 will rotate the cam 15 anti-clockwise relative to the pointer 7 thus allowing the contact in switch 18 to close, that in switch 17 remaining open. It will be appreciated that the shape of the cams 14 and 15 may be made such that there is a small range of angular movement (e.g. two degrees) in which both switch plungers remain depressed.

In an aircraft fuel system, the indicator described above may be employed to give automatic control of the cut-off of fuel flow during both fuelling and defuelling, assuming that the pointer 2 is driven through rotation of the shaft 1 to indicate the total contents of the tanks, as measured for example by a capacitative fuel gauging apparatus, such for example as that described in the specification of British Patent No. 695,074.

A block diagram of a simple aircraft fuel system (being an example of a vehicle's fuel system according to the invention) including a capacitative fuel gauging apparatus is shown in FIGURE 3, by way of example. The aircraft tanks are shown as a single block 30 connected by a conduit 31 to a flow control valve 32 and a further conduit 33 leading to an external fuelling connection. The gauging apparatus is of the kind described in the specification of British Patent No. 695,074 and includes tank capacitors and a wholly immersed reference capacitor, all represented by the block 34 shown within the tank block 30, which are electrically connected to an electric A.C. bridge circuit 35. The unbalance voltage from the bridge circuit 35 is applied to an amplifier 36 which controls an electric motor 37. The latter drives a shaft 38 which adjusts a variable resistance in the bridge circuit 35 in such a manner as to tend to reduce any unbalance voltage to zero. (An exact arrangement of the bridge circuit is described in detail in British Patent No. 695,074.) As explained in the aforesaid specification the position of the shaft 38 represents the total fuel contents of the tank 30 and it is coupled to an indicator 39 in addition, this being an indicator as shown in FIGURES 1 and 2, to drive the shaft 1.

Shown separately in block 39 of FIGURE 3 are the contacts 40 and 41 of the two micro switches 17 and 18, one open and the other closed, illustrating the condition when pointer 2 indicates less than the pointer 7. The contacts 40 and 41 are connected to a fuel flow controller 42 by separate leads and to one side of a voltage source 43 by a common lead. The other side of the voltage source 43 is connected to the controller 42. The controller 42 includes electro-magnetic relays controlling the operation of a mechanism for opening and closing the valve 32, a suitable linkage between the valve and the controller being indicated by the dotted line 44 in FIGURE 3. Depending on whether refuelling or defuelling is to be carried out, either contact 41 or contact 40 respectively will be connected in circuit within the controller 42, by means of a switch, and closure of the contact is arranged to actuate the controller 42 to open the valve 32, for example by energising a relay which in turn operates the valve opening mechanism. On opening the contact, the valve closes again.

In refuelling, therefore, the pointer 7 is set to a position corresponding to the desired final fuel contents of the tanks 30 and the switch on the controller 42 is set to connect contact 40 into circuit. As long as the pointer 2 indicates an amount less than that set by the pointer 7 (i.e. as long as the contents are less than the desired amount), the contact 40 of switch 18 will be closed and the valve 32 will remain open. When the pointer 2 becomes aligned with pointer 7, however, the contact 40 will open and the valve 32 will close. Similarly, in de-fuelling, the pointer 7 can be set to a position corresponding to the desired final contents after pumping some fuel out of the tanks. The switch in the controller 42 is now set to connect the contact 41 into circuit. The pointer 2 will initially indicate a higher value than the pointer 7 and the contact 41 of the switch 17 will be closed. As defuelling proceeds, the contact 41 will open when the indicated contents equal the value set by the position of the pointer 7, and the valve 32 will close.

It will be appreciated that the switches 17 and 18 could be mounted to rotate with the shaft 1, if required. Further, the switches need not necessarily be micro switches nor need the switches be confined to simple open/closed contacts as described, changeover contacts for example being another possibility. The connections to the switches could also be made through slip-rings instead of the flying leads as described. Further, the system shown in FIGURE 3 can be made more complex, in known manner, by dividing the tanks into groups, providing means for gauging the contents of each group, and a valve controlled by the indicator of the gauging means for controlling the flow into or out of the group.

Indicating instruments according to the invention are not however limited to the particular application described and may be used in any application where it is required to operate switches when the pointer comes into coincidence with an auxiliary pointer.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. An indicating instrument of the kind in which a pointer is mounted on a shaft and rotates relative to a scale on rotation of the shaft, which instrument is provided with an auxiliary pointer, means supporting the auxiliary pointer for rotation independently of the main pointer but about a common axis, a pair of actuating pins, mounted to lie parallel to but displaced at different distances from the common axis, one coupled to the main pointer for rotation therewith about the common axis and the other coupled to the auxiliary pointer for rotation therewith about the common axis, a pair of cams, means supporting each cam for independent rotation about the common axis, spring means for biasing the cams towards one another, the construction arrangement of the pins and the cams being such that, when the main and auxiliary pointers are aligned with one another, the pins are aligned with one another and the cams are held apart against the action of the spring means by the pins, a pair of electric switches each having contacts having at least two conditions of operation, and means supporting the switches for rotation with one of the pointers, the switches being positioned with respect to the cams to be actuated to change from one operating condition to another by a respective one of the cams only when that cam is in contact with the actuating pin which rotates with the pointer with which the switches rotate.

2. An indicating instrument according to claim 1 in which the switches are mounted for rotation with the auxiliary pointer.

3. An indicating instrument according to claim 1 in which said means supporting the auxiliary pointer comprises a sleeve coaxial with, and able to rotate with respect to, the shaft carrying the main pointer.

4. An indicating instrument according to claim 3 in which the sleeve carries a gear wheel which is also coaxial with the shaft and there is provided a manual setting knob for setting the position of the auxiliary pointer and driving means for imparting rotary motion from the knob to the gear wheel, the driving means including means for exerting a frictional torque to resist motion of the gear wheel when the knob is not operated.

5. An indicating instrument according to claim 4 in which the actuating pin which is coupled to the auxiliary pointer, is mounted on the gear wheel.

6. An indicating instrument according to claim 1 in which the cams are arms projecting radially with respect to the common axis at different points along its length, said supporting means comprising, for each cam, a sleeve mounted co-axially with the shaft for independent rotation with respect to it.

7. An indicating instrument according to claim 6 in which the actuating pins are mounted to project between the arms of the cams from opposite directions.

8. An indicating instrument according to claim 7 in which the actuating pin which is coupled to the main pointer, is secured to an arm projecting radially from the shaft.

9. An indicating instrument according to claim 1 in which the switches are micro-switches, the operating members of which are positioned to be engaged and depressed by the cams when in a particular angular position relative to the pointer with which the switches rotate.

10. An indicating instrument having a case with a viewing aperture, a first pointer visible within the viewing aperture, a shaft mounted for rotation about its longitudinal axis and carrying the first pointer, a scale fixed in the case in view within the viewing aperture and positioned relative to the pointer to give a reading indicative of the angular position of the shaft, a second pointer, a sleeve coaxial with the shaft, rotatable relative thereto and carrying the second pointer, the second pointer being positioned within the viewing aperture to register with the scale, a manually adjustable member, means for transmitting a drive from the manually adjustable member to the sleeve to position the second pointer relative to the scale, a first pin lying parallel to but displaced from the shaft in the plane containing the pointer and the shaft axis, means supporting the first pin for rotation about the shaft as the shaft itself rotates, a second pin lying parallel to the shaft but displaced from it by an amount different from the displacement of the first pin, means supporting the second pin from said sleeve to lie in the plane containing the second pointer and the axis of the shaft and to rotate about said axis with the second pointer, the first and second pins having overlapping parts of their lengths, a pair of cam arms each mounted for independent rotation about the axis of the shaft and each extending radially from the axis further than the displacement of both the first and the second pin, the cam arms being positioned along the axis of the shaft opposite said overlapping parts of the pins, spring means urging the cam arms towards one another and towards the pins from opposite sides thereof, a pair of electrical switches, an actuator for each switch and means supporting the actuators and switches for rotation about the axis of the shaft with the second pointer, the actuators being positioned relative to the second pin each to be engaged by a respective one of the cam arms when the arm is in contact with the second pin.

11. An indicating instrument according to claim 10 in which the drive transmitting means comprising a gear wheel integral and coaxial with the sleeve, and said supporting means for the switches and actuators is secured to the gear wheel.

12. An indicating instrument having a case with a viewing aperture, a first pointer visible within the viewing aperture, a shaft mounted for rotation about its longitudinal axis and carrying the first pointer, a scale fixed in the case in view within the viewing aperture and positioned relative to the pointer to give a reading indicative of the angular position of the shaft, a second pointer, a sleeve coaxial with the shaft, rotatable relative thereto and carrying the second pointer, the second pointer being positioned within the viewing aperture to register with the scale, a manually adjustable member, means for transmitting a drive from the manually adjustable member to the sleeve to position the second pointer relative to the scale, a first pin lying parallel to but displaced from the shaft in the plane containing the pointer and the shaft axis, means supporting the first pin for rotation about the shaft as the shaft itself rotates, a second pin lying parallel to the shaft but displaced from it by an amount different from the displacement of the first pin, means supporting the second pin from said sleeve to lie in the plane containing the second pointer and the axis of the shaft and to rotate about said axis with the second pointer, the first and second pins having overlapping parts of their lengths, a pair of cam arms each mounted for independent rotation about the axis of the shaft and each extending radially from the axis further than the displacement of both the first and the second pin, the cam arms being positioned along the axis of the shaft opposite said overlapping parts of the pins, spring means urging the cam arms towards one another and towards the pins from opposite sides thereof, a pair of electrical switches, an actuator for each switch and means supporting the actuators and switches for rotation about the axis of the shaft with the first pointer, the actuators being positioned relative to the first pin each to be engaged by a respective one of the cam arms when the arm is in contact with the first pin.

13. A vehicle's fuel system of the kind having at least one fuel tank, means for gauging the fuel contents of the tank, means for controlling the flow of fuel to and from the tank, and an indicating instrument for indicating the contents of the tank as gauged by said gauging means, the indicating instrument being of the kind in which a pointer is mounted on a shaft and rotates relative to a scale on rotation of the shaft, and being provided with an auxiliary pointer, means supporting the auxiliary pointer for rotation independently of the main pointer but about a common axis, a pair of actuating pins, mounted to lie parallel to but displaced at different distances from the common axis, one coupled to the main pointer for rotation therewith about the common axis and the other coupled to the auxiliary pointer for rotation therewith about the common axis, a pair of cams, means supporting each cam for independent rotation about the common axis, spring means for biasing the cams towards one another, the construction and arrangement of the pins and the cams being such that, when the main and auxiliary pointers are aligned with one another, the pins are aligned with one another and the cams are held apart against the action of the spring means by the pins, a pair of electric switches each having contacts having at least two conditions of operation, and means supporting the switches for rotation with one of the pointers, the switches being positioned with respect to the cams to be actuated to change from one operating condition to another by a respective one of the cams only when that cam is in contact with the actuating pin which rotates with the pointer with which the switches rotate and the system further comprising an electrical control circuit for controlling the operation of the fuel flow controlling means, which circuit comprises the contacts of the switches provided in the indicating instruments.

14. A vehicle's fuel storage system comprising fuel storage means, means for generating a signal representing the fuel contents of the storage means, means permitting passage of fuel into and out of the storage means, a flow control element in the last mentioned means, the element having open and closed operating conditions, a controller for determining the operating condition of the control element, the controller comprising electric voltage responsive means for changing the condition of the control element, and an indicating instrument coupled to said signal generating means and having a shaft which is rotated about its axis in accordance with the magnitude of said signal, a pointer mounted on the shaft for rotation therewith and a scale mounted relative to the pointer to indicate the position of the pointer and hence the contents of the storage means, the instrument further comprising an auxiliary pointer, means supporting the auxiliary pointer for rotation independently of the main pointer but about a common axis, a pair of actuating pins, mounted to lie parallel to but displaced at different distances from the common axis, one coupled to the main pointer for rotation therewith about the common axis and the other coupled to the auxiliary pointer for rotation therewith about the common axis, a pair of cams, means supporting each cam for independent rotation about the common axis, spring means for biasing the cams towards one another, the construction and arrangement of the pins and the cams being such that, when the main and auxiliary pointers are aligned with one another, the pins are aligned with one another and the cams are held apart against the action of the spring means by the pins, a pair of electric switches each having contacts having at least two conditions of operation, and means supporting the switches for rotation with one of the pointers, the switches being positioned with respect to the cams to be actuated to change from one operating condition to another by a respective one of the cams only when that cam is in contact with the actuating pin which rotates with the pointer with which the switches rotate and the system further comprising a pair of electric circuits coupled to said responsive means and switching means for selecting either one of said circuits to render it operative to the exclusion of the other, each circuit comprising a contact of a respective one of said switches and means comprising said contact for applying a voltage to said responsive means when the switch is in a predetermined one of its operating conditions.

References Cited in the file of this patent

UNITED STATES PATENTS

| 1,057,313 | Worliczek | Mar. 25, 1913 |
| 2,827,621 | Reichert et al. | Mar. 18, 1958 |

FOREIGN PATENTS

| 131,786 | Sweden | May 22, 1951 |
| 233,358 | Germany | 1910 |